Nov. 30, 1926.
A. BREZOVITZ
1,608,923
DUMP CAR
Filed June 15, 1922   3 Sheets-Sheet 1
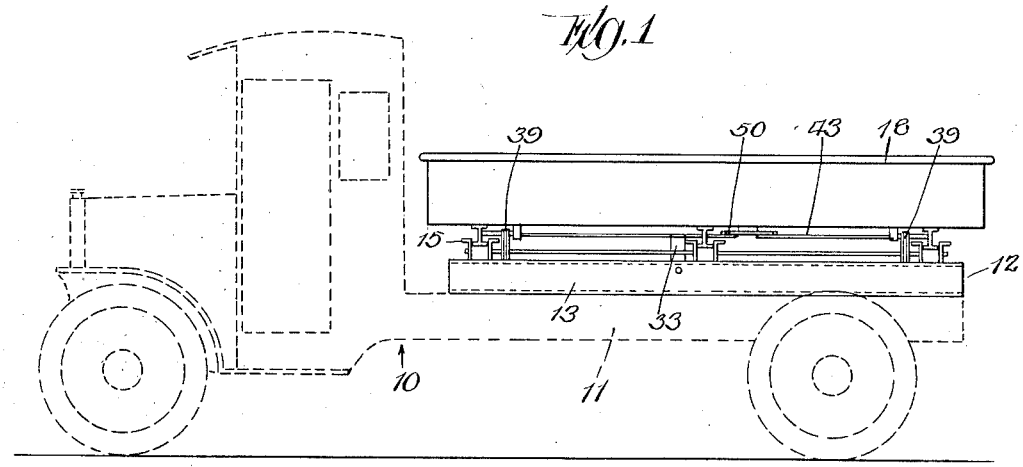
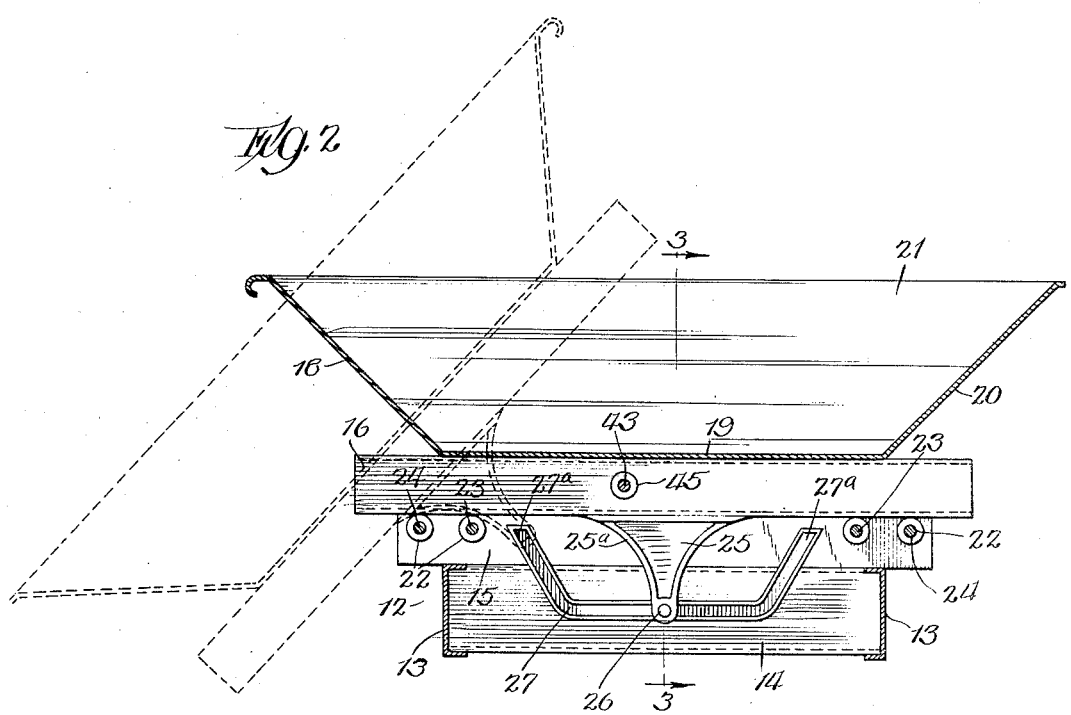
Inventor
Anton Brezovitz
by Rector, Hibben, Davis, & Macauley
Attys.

Nov. 30, 1926.
A. BREZOVITZ
1,608,923
DUMP CAR
Filed June 15, 1922    3 Sheets-Sheet 2
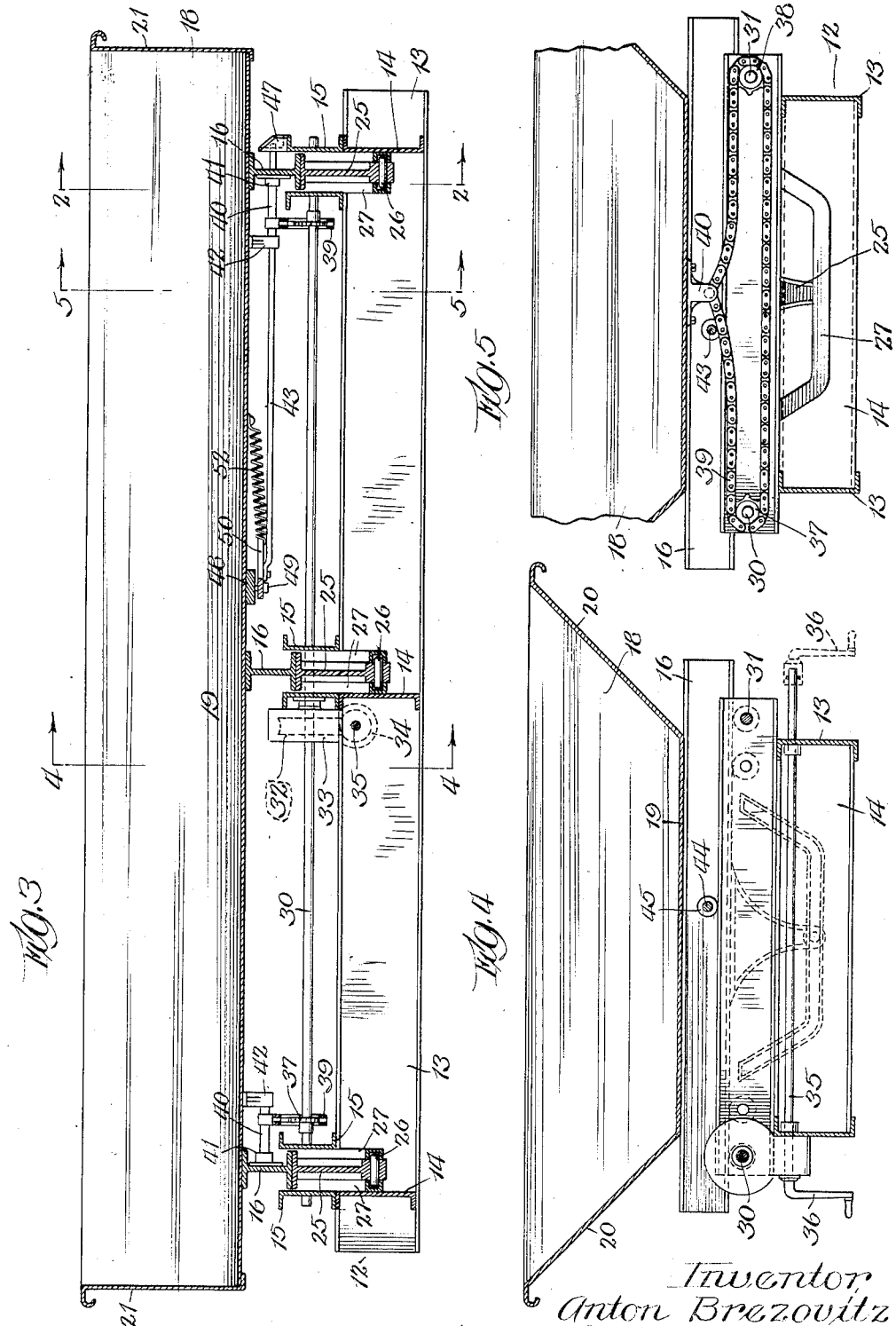
Inventor
Anton Brezovitz
by Rector, Hibben, Davis, and Macauley
Attys.

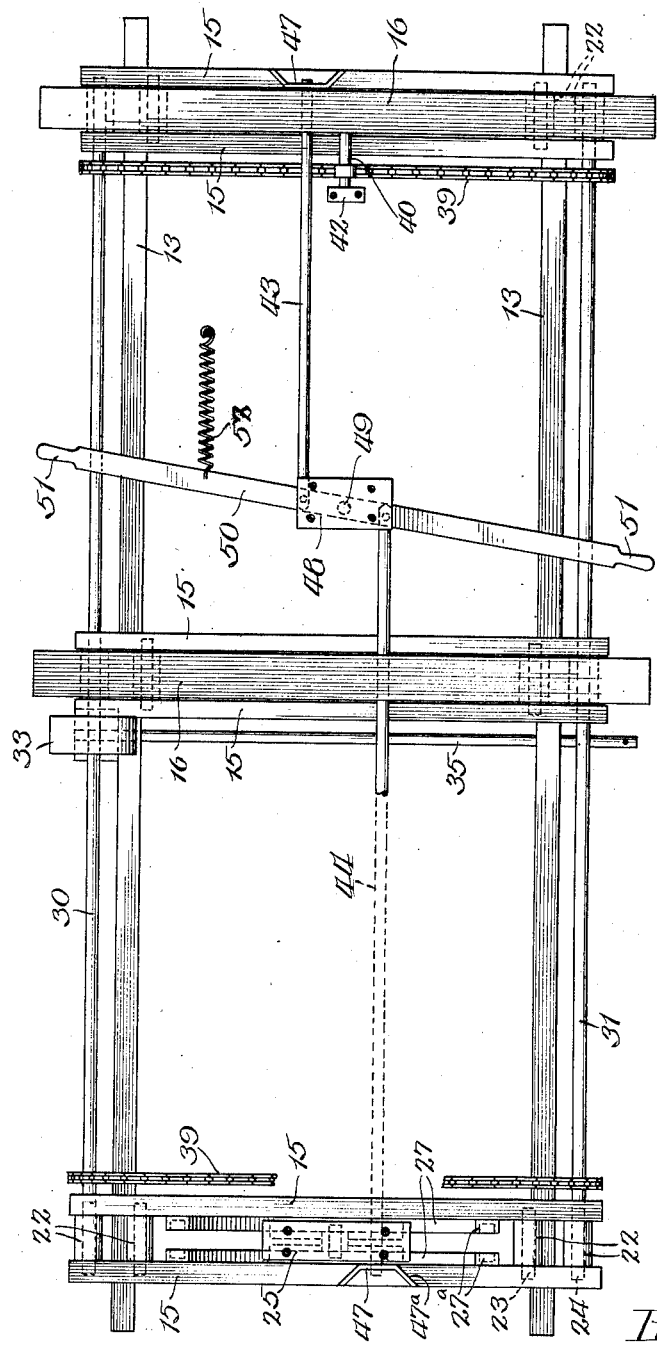

Patented Nov. 30, 1926.

1,608,923

UNITED STATES PATENT OFFICE.

ANTON BREZOVITZ, OF SOUTH BEND, INDIANA.

DUMP CAR.

Application filed June 15, 1922. Serial No. 568,422.

This invention relates to dump cars and its purpose is to provide improved dump car mechanisms particularly adapted for use with automobile trucks.

One of the principal objects of the invention is to provide an improved dump car peculiarly adapted for handling garbage and the like. A further object is to provide a body capable of being dumped in either direction laterally of the automobile truck by which it is carried. Still another object is to provide a simple and efficient dump mechanism for moving the body to and from its dumping position.

These and other objects and advantages of the invention will appear more clearly from the following specification taken with the accompanying drawings in which one embodiment is illustrated. In the drawings Fig. 1 shows a side elevation of the dumping body applied to an automobile truck; Fig. 2 shows a transverse vertical section on the line 2—2 of Fig. 3; Fig. 3 shows a longitudinal vertical section on the line 3—3 of Fig. 2; Fig. 4 shows a transverse vertical section on the line 4—4 of Fig. 3; Fig. 5 shows a transverse vertical section on the line 5—5 of Fig. 3 and Fig. 6 shows a top plan view with the body removed, illustrating the means for locking the body in its normal position on the frame.

The invention is illustrated in connection with an automobile truck 10 comprising longitudinal frame members 11 adapted to support the dumping body and its frame which constitute the improvement of the present invention. The dumping body is carried by a sub-frame 12 comprising longitudinal frame members 13 of channel form connected by transverse frame members 14. The frame members 13 are adapted to rest upon the longitudinal frame members of the truck to which they are secured by bolts or other fastening means. The longitudinal frame members 13 support three pairs of transverse track members 15 which are of channel form, the flanges of the channels being secured to the longitudinal members of the sub-frame 12 by rivets or the like. In the embodiment shown there are three pairs of track members 15 arranged with their flanges directed away from each other and these pairs of track members are adapted to receive between them the H-beam frame members 16 which have their upper flanges secured to the under-side of the body 18.

This body comprises a lower wall 19 outwardly diverging side-walls 20 and end walls 21. These walls of the body are formed of sheet metal which is united at the joints to form a water tight enclosure adapted for holding garbage and the like.

The beams 16 carried by the under-side of the body 18 are adapted to rest upon rollers 22 which are pivoted on pins 23 and 24 extending between the track members 15. Each beam 16 has a V-shaped arm 25 secured to the lower flange thereof midway between its ends and these arms extend downwardly between the pairs of track members 15 as shown particularly in Figs. 2 and 3. A pin 26 projects longitudinally of the car from either side of the lower extremity of each arm 25 and each pin engages a guide member 27 of U-shaped form having its upper extremities secured to one of the track members 15. The ends of the channels of the guide members 27 are closed as shown at 27ᵃ so that the movement of the pins 26 in these guideways is limited. The guide members 27 are arranged in pairs between the track members 15 and project downwardly into the region between the side members 13 of the sub-frame, their middle portions being horizontal so that when the dumping body is in its normal position as shown by heavy lines in Fig. 2, the upward movement of the body is restrained by the flanges of these guide members co-acting with the pins 26. When the body moves laterally to the dumping position illustrated by dotted lines in Fig. 2 the pins 26 first travel horizontally in the guide-ways 27 and thence upwardly in the lateral arms of the guide-ways until the extremities 27ᵃ thereof are reached. During this movement the lower flanges of the beams 16 travel on the rollers 22 and as the final dumping position is approached these rollers co-act with the curved sides 25ᵃ of the guiding arms.

The mechanism for moving the body 18 on the supporting sub-frame 12 comprises two longitudinal shafts 30 and 31 which are journaled in bearings formed in the extremities of the track members 15 at opposite sides of the sub-frame 12. A worm wheel 32 is secured to the middle point of the shaft 30 and enclosed in a housing 33 which also contains a worm 34 meshing with the worm wheel. The worm is secured to a transverse shaft 35 journaled in bearings carried by the longitudinal frame members 13 and a handle 36 is adapted to form a detachable engagement with either end of this shaft in order to rotate it and operate the dumping mechanism. The ends of the shaft 30 have sprocket gears 37 secured thereto and similar sprocket gears 38 are rotatably mounted on the opposite shaft 31. A sprocket chain 39 is mounted upon each pair of sprocket gears 37—38 and the ends of each chain 39 are secured to short shafts 40 which are mounted in bearings 41 carried by the end beams 16 and in brackets 42 secured to the under-side of the body. Upon rotation of the shaft 35 through the operating handle 36, the driving shaft 30 causes the chains 39 to exert a dumping force on the body 18 through the brackets 40 so that the body is moved in one direction or the other laterally of the frame upon the rollers 22, the direction of movement depending upon the direction of rotation of the handle 36. Sufficient slack should be provided in each of the chains 39 to permit the elevation of the shafts 40 which occurs when the body reaches the dumping position illustrated by dotted lines in Fig. 2.

In order to prevent the lateral movement of the body on the rollers 22 during the travel of the automobbile truck a latching mechanism is provided comprising two longitudinal rods 43 and 44 which are mounted to slide in bearings 45 carried by the transverse beams 16. The extremities of these rods are adapted to engage apertures in brackets 47 which are secured to the upper flanges of the endmost track members 15. The other extremities of the rods 43 and 44 are pivotally connected to a plate 48 which has its middle point pivoted at 49 to the under-side of the body 18. The plate 48 is connected to a transverse lever 50 having handles 51 at opposite sides of the body. This lever is actuated by a coiled spring 52 connected to the body so that the plate 48 normally causes the rods 43 and 44 to engage the brackets 47. When the operator wishes to dump the body, the lever 50 can be operated from either side of the truck to release the rods 43 and 44 from the brackets 47 and thus permit the body to move laterally on the rollers 22. When the body is returned to its normal position after being dumped, the extremities of the rods 43 and 44 engage the inclined surfaces 47ª of the brackets and automatically pass into position engaging the apertures in these brackets.

From the foregoing description it will be apparent that this invention provides a simple form of mechanism whereby the body can be released from its normal position and dumped in either direction laterally of the truck. The latching mechanism for securing the body in its normal position and the mechanism for effecting the dumping movement of the body may be operated from either side of the truck and, although this mechanism has been illustrated as being manually operated, it can of course be mechanically driven from the engine of the truck, if desired. When the body reaches the dumping position the contents thereof slide out by gravity over the inclined lower wall 19 and the lowermost side wall 20, the inclination of the side wall to the lower wall being such that the side wall has a downward inclination when the body reaches its final dumping position.

Although I have shown and described but one form of the invention for purposes of illustration, it will be understood that it may be constructed in other forms without departing from the scope of the appended claims.

I claim:

1. A dump car comprising a body, a guiding arm extending downwardly from the under side of said body, a pair of guiding members extending transversely of said body adjacent to each other with their ends directed upwardly, said guiding members having longitudinal channels in their lateral faces directed toward each other, and a guiding pin carried by said guiding arm and engaging the channels in both of said guiding members.

2. A dump car comprising a body, a supporting frame, a plurality of pairs of guiding members carried by said frame beneath said body, said guiding members extending transversely of said body and having their ends directed upwardly with longitudinal channels formed in the adjacent faces of each pair, a plurality of guiding arms secured to the under side of said body and extending downwardly therefrom, each guiding arm being located between the guiding members of one pair, and a pin mounted in each guiding arm and having its ends engaging the opposite channels of one pair of guiding members.

3. A dump car comprising a body, an arm extending downwardly from the under side of said body, a pair of channel guide members having their flanges directed toward each other, a pin carried by said arm and engaging the channels of said guide members and separate means connected to said body for moving said body.

4. A dump car comprising a body, a supporting frame comprising transverse track members for supporting said body, a pair of longitudinal shafts journaled in bearings carried at opposite sides of said supporting frame, endless chains geared to said shafts adjacent opposite ends of said body and each connected to the under side of said body, a transverse shaft geared to one of said longitudinal shafts, means adapted to engage said transverse shaft at either end thereof to permit operation of said longitudinal shafts from either side of said body, a plurality of guiding arms extending downwardly from the under side of said body, a plurality of guiding members secured to said supporting frame and having channels therein extending transversely of said body with their ends directed upwardly, and guiding pins carried by said arms to travel in said channels.

5. A dump car comprising a body, a series of transverse beams secured to the under-side of said body, track members extending transversely of said body, rollers carried by said track members and co-acting with said beams, means for moving said track members on said rollers, guiding arms extending downwardly from said beams and having parts adapted to engage said rollers during the movement of said body and guide members secured to said track members and connected with said arms.

6. A dump car comprising a body, a series of H-beams secured to the under-side of said body, arms secured to the lower flanges of said beams and extending downwardly therefrom, said arms having curved lateral edges, U-shaped guide members of channel cross-section mounted in fixed position beneath said beams, pins carried by said arms and engaging the channels of said guide members, a series of transverse track members, rollers carried by said track members to co-act with the lower flanges of said beams and with the edges of said arms, and means for moving said body laterally on said rollers.

ANTON BREZOVITZ.